US005293099A

United States Patent [19]

Bobel

[11] Patent Number: 5,293,099

[45] Date of Patent: Mar. 8, 1994

[54] CIRCUIT FOR DRIVING A GAS DISCHARGE LAMP LOAD

[75] Inventor: Andrew Bobel, Des Plaines, Ill.

[73] Assignee: Motorola Lighting, Inc., Buffalo Grove, Ill.

[21] Appl. No.: 885,173

[22] Filed: May 19, 1992

[51] Int. Cl.[5] ...................... H04B 37/02; H04B 39/04; H04B 41/36

[52] U.S. Cl. .................................... 315/225; 315/307; 315/360; 315/DIG. 7

[58] Field of Search ................... 315/127, 205, 209 R, 315/225, 244, 247, 291, 307, 360, DIG. 7

[56] References Cited

U.S. PATENT DOCUMENTS 4,477,748 10/1984 Grubbs ............................ 315/307 X
5,142,202 8/1992 Sun et al. ................. 315/DIG. 7 X
5,179,509 1/1993 Ling ......................... 315/DIG. 7 X

FOREIGN PATENT DOCUMENTS 1-309297 12/1989 Japan ............................ 315/DIG. 7

*Primary Examiner*—Tony M. Argenbright
*Attorney, Agent, or Firm*—J. Ray Wood

[57] ABSTRACT

A circuit (100) for driving an instant-start fluorescent lamp (102) has an inverter (103, 132) and a series-resonant LC oscillator (146, 152). A capacitor (190) begins charging after power-up of the circuit and when its voltage reaches a certain level causes breakdown of a diac (192), which discharges the capacitor into an inverter transistor (132) to trigger operation of the inverter. Re-triggerring of the inverter is prevented by a diode (194) which subsequently discharges the capacitor cyclically, and by a capacitor (186) which enables a transistor (180) at a predetermined time following power-up. The occurrence of a subsequent fault condition causes a capacitor (210) to charge and to enable a transistor (196) which disables the inverter. Charging of the initiating capacitor (190) is prevented by an open circuit between terminal connectors (160, 162) if the lamp is not present.

16 Claims, 1 Drawing Sheet

CIRCUIT FOR DRIVING A GAS DISCHARGE LAMP LOAD

BACKGROUND OF THE INVENTION

This invention relates to circuits for driving gas discharge lamps, and particularly, though not exclusively, to circuits for driving fluorescent lamps.

In circuits for driving fluorescent lamps, and particularly in circuits for driving "instant-start" fluorescent lamps (which are designed to start, i.e. to strike an arc between end electrodes, immediately a voltage is applied between its electrodes, without requiring preheating of lamp filaments as is typical in other kinds of fluorescent lamps), it may be desirable that the circuit should operate safely and efficiently in the event that a lamp does not strike or in the event of a lamp fault.

SUMMARY OF THE INVENTION

In accordance with the invention there is provided a circuit for driving a gas discharge lamp load, the circuit comprising:

oscillator means;

initiating means for initiating operation of the oscillator means after power-up of the circuit; first disabling means for disabling the initiating means after a predetermined time following power-up of the circuit; and second disabling means for disabling the oscillator means in response to a fault condition after the predetermined time.

It will be understood that such a circuit allows safe and efficient operation in the event of non-striking of the lamp load or in the event of a fault condition. In a preferred embodiment, such a circuit can provide such operation in a simple and effective manner.

BRIEF DESCRIPTION OF THE DRAWINGS

One fluorescent lamp driver circuit in accordance with the present invention will now be described, by way of example only, with reference to the accompanying drawings, in which.

DESCRIPTION OF THE PREFERRED EMBODIMENT

Figure 1:
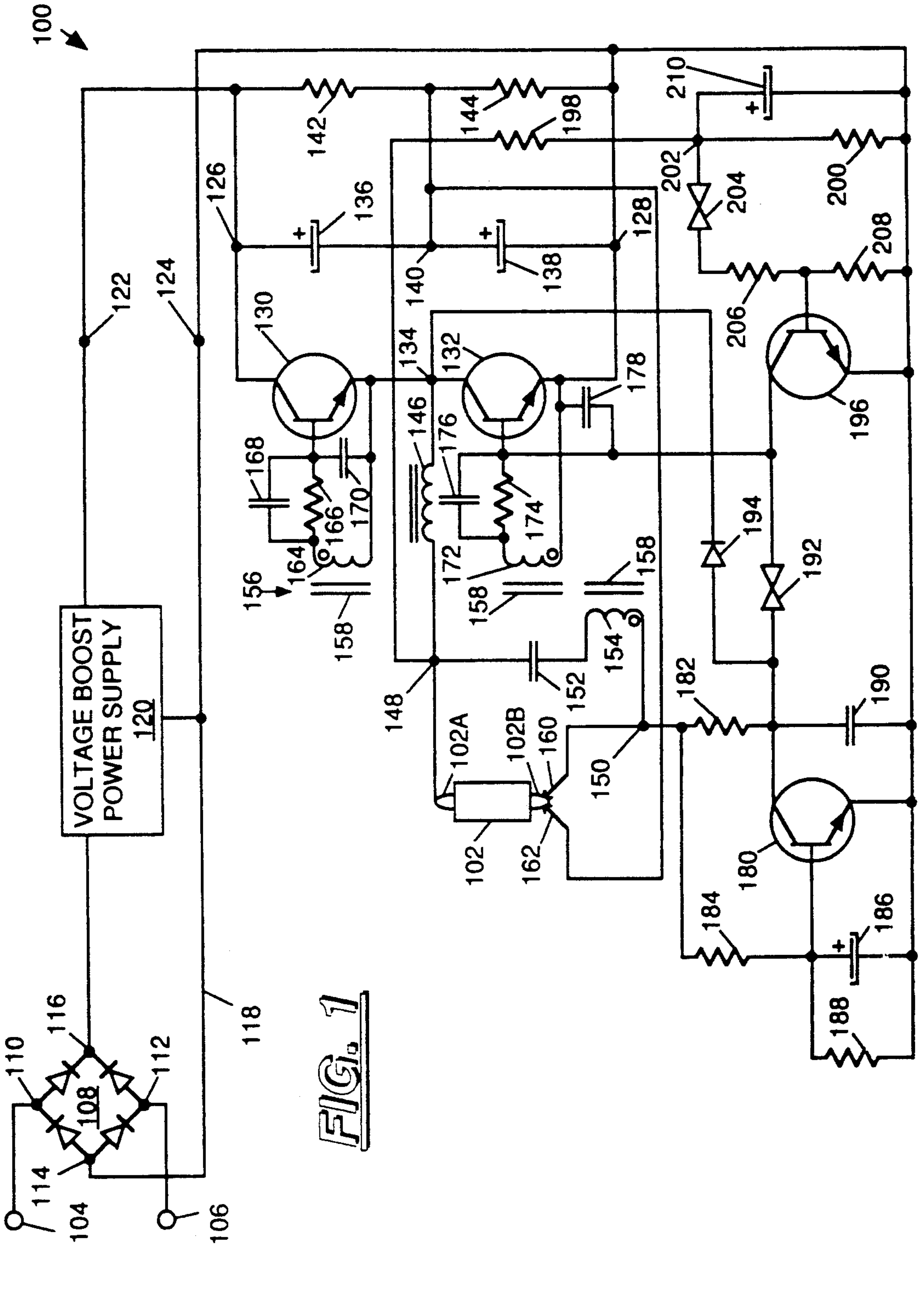
FIG. 1 shows a schematic circuit diagram of a driver circuit for driving an "instant start" fluorescent lamp.

Referring now to FIG. 1, a circuit 100, for driving a single "instant start" fluorescent lamp 102 has two input terminals 104, 106 for receiving thereacross an AC supply voltage of approximately 120V at a frequency of 60 Hz. A full-wave rectifying bridge circuit 108 has two input nodes 110, 112 connected respectively to the input terminals 104, 106, and has two output nodes 114, 116. The output node 114 of the bridge 108 is connected to a ground voltage rail 118. The fluorescent lamp 102 is of the "instant start" kind which, as is well understood in the art, is designed to start (i.e., to strike an arc between its end electrodes 102A and 102B) immediately a voltage is applied between its electrodes, without requiring pre-heating of lamp filaments as is typical in other kinds of fluorescent lamps.

A voltage boost power supply 120 (the typical detailed construction of which is well-known to a person skilled in the art) is connected to the output nodes 114 and 116 of the bridge circuit 108. The voltage boost power supply 120 is configured to produce in use a boosted voltage DC voltage of approximately 275V between power supply output nodes 122 and 124.

The power supply output nodes 122 and 124 are connected to input nodes 126 and 128 of a half-bridge inverter formed by two npn bipolar transistor 130 and 132 (each of the type MJE18004). The transistor 130 has its collector electrode connected to the input node 126, and has its emitter electrode connected to an output node 134 of the inverter. The transistor 132 has its collector electrode connected to the node 134, and has its emitter electrode connected to the input node 128. Two electrolytic capacitors 136 and 138 (each having a value of approximately 47 μF) are connected in series between the inverter input nodes 126 and 128 via an intermediate node 140. Two resistors 142 and 144 (each having a value of approximately 470KΩ) are connected in series between the inverter input nodes 126 and 128 via the intermediate node 140.

The inverter output node 134 is connected, via a cored inductor 146 (having a value of approximately 2.75 mH) to a node 148. The node 148 is serially connected to a node 150 via a capacitor 152 (having a value of approximately 10 nF) and a primary winding 154 of a transformer 156. The transformer 156 is wound on a core 158, and the primary winding 154 is formed by approximately ten turns of winding wire.

A connector terminal 160 is connected to the node 150, and a connector terminal 162 is connected to the node 140. As will be explained in greater detail below, the connector terminals 160 and 162 are arranged so that they are bridged by the electrode 102B of the lamp 102 when the lamp is inserted in the circuit. The node 148 is connected to the electrode 102A of the lamp 102 when the lamp is inserted in the circuit.

A secondary winding 164 (formed by approximately thirty turns of winding wire on the core 158) of the transformer 156 is coupled between the base and emitter electrodes of the transistor 130. A resistor 166 (having a value of approximately 330Ω) is connected in series between the secondary winding 164 and the base electrode of the transistor 130. A capacitor 168 (having a value of approximately 0.47 μF) is connected in parallel with the resistor 166. A capacitor 170 (having a value of approximately 0.1 μF) is connected between the base and emitter electrodes of the transistor 130.

A further secondary winding 172 (formed by approximately thirty turns of winding wire on the core 158) of the transformer 156 is coupled between the base and emitter electrodes of the transistor 132. A resistor 174 (having a value of approximately 330Ω) is connected in series between the secondary winding 172 and the base electrode of the transistor 132 A capacitor 176 (having a value of approximately 0.47 μF) is connected in parallel with the resistor 174. A capacitor 178 (having a value of approximately 0.1 μF) is connected between the base and emitter electrodes of the transistor 132.

The secondary windings 164 and 172 are connected with opposite polarities between the base and emitter electrodes of the inverter transistors 130 and 132 respectively.

For reasons which will be explained below, a npn bipolar transistor 180 (of the type 2N3904) has its collector electrode connected to the node 150 via a resistor 182 (having a value of approximately 100KΩ). The node 150 is also connected via a resistor 184 (having a value of approximately 220KΩ) to the base electrode of the transistor 180. A capacitor 186 (having a value of approximately 100 μF) and a resistor 188 (having a value of approximately 23KΩ) are connected in parallel between the base and emitter electrodes of the transistor 180. A capacitor 190 (having a value of approximately 0.22 μF) is connected between the collector and emitter electrodes of the transistor 180. The emitter electrode of the transistor 180 is connected to the ground reference terminal 128.

A diac 192 (having a voltage breakdown of approximately 32V) is connected between the collector electrode of the transistor 180 and the base electrode of the inverter transistor 132 to the node 148. A diode 194 (of the type 1N4006) has its anode connected to the base electrode of the transistor 180, and has its cathode connected to the inverter output node 134.

A further npn bipolar transistor 196 (of the type MJE13002) has its collector electrode connected to the base electrode of inverter transistor 132. Resistors 198 and 200 (having values of approximately 100KΩ and 27KΩ respectively) are connected in series between the node 148 and the ground reference terminal 128 via an intermediate node 202. The node 202 is connected to the base electrode of the transistor 196 via a diac 204 (having a voltage breakdown of approximately 32V) and a resistor 206 (having a value of approximately 30Ω) connected in series. A resistor 208 (having a value of approximately 30Ω) is connected between the base and emitter electrodes of the transistor 196. A capacitor 210 (having a value of approximately 22 μF) is connected between the node 202 and the ground reference terminal 128. The emitter electrode of the transistor 196 is connected to the ground reference terminal 128.

It will be understood that in use of the circuit 100, the inductor 146 and the capacitor 152 form a series-resonant LC circuit which is driven by the inverter (transistors 130 and 132 and their associated components) and whose output is fed back (via transformer 156) to control the inverter. It will thus be understood that the inverter transistors 130 and 132 and their associated components, together with this series-resonant LC circuit and the feedback transformer 156, form a self-oscillating inverter which powers the fluorescent lamp 102. In the preferred embodiment component values are chosen so that the self-oscillating inverter oscillates with a substantially constant frequency of approximately 40 KHz.

In operation of the circuit of FIG. 1, with a voltage of 120V, 60 Hz applied across the input terminals 104 and 106, the bridge 108 produces between the node 116 and the ground voltage rail 118 a unipolar, full-wave rectified, DC voltage having a frequency of 120 Hz. As mentioned above, the voltage boost power supply 120 boosts the DC voltage between output terminals 122 and 124 to approximately 275V.

In steady state operation of the circuit, with the lamp 102 struck and operating normally, this boosted DC voltage powers the inverter formed by the transistors 130 and 132, the inverter drives the series-resonant LC oscillator 146 and 152 to produce a high frequency AC voltage of approximately 40 KHz, and the voltage produced across the capacitor 152 and the winding 154 is applied to and drives the lamp 102.

Safe and efficient start-up of the circuit is achieved in the following manner. Immediately following power-up of the circuit, before the voltage boost power supply 120 is activated, an unboosted voltage of approximately 170V appears across the terminals 126 and 128, a voltage of half this value appears at the node 140 this halved voltage is conducted to the node 150 through the connector terminals 162 and 160 (which are bridged by the lamp electrode 102B). The voltage at node 150 causes the capacitor 190 to charge through the resistor 182. When the voltage on the capacitor 190 reaches 32V, the diac 192 breaks down and allows the capacitor 190 to discharge into the base of the inverter transistor 132. In the preferred embodiment the component values are chosen so as to cause this diac breakdown to occur approximately four milliseconds after the halved voltage appears at the node 150. This injection of charge into the base of the transistor 132 causes the transistor to turn ON, initiating operation of the self-oscillating inverter. Initiation of operation of the self-oscillating inverter causes activation of the voltage boost power supply 120, which boosts the voltage across the terminals 126 and 128 to its steady-state value of approximately 275V.

When the transistor 132 is ON, the voltage at the node 134 is pulled low, causing the diode 194 to become forward biased and causing any remaining charge on the capacitor 190 to discharge to the node 134. Thus, when the inverter is triggered into steady-state operation, the capacitor 190 is discharged to the node 134 in each half cycle when the transistor 132 is ON, so preventing the voltage on the capacitor from again reaching 32V at which it would cause breakdown of the diac 192 and would re-trigger the inverter transistor 132. Thus, the diode 194 allows stable and efficient operation of the self-oscillating inverter once triggered into operation.

At power-up of the circuit, when the voltage appears at the node 150, in addition to charging the capacitor 190 as described above, the voltage also causes the capacitor 186 to charge through the resistor 184. The component values are chosen so that voltage on the capacitor 184 increases at a much slower rate than that on the capacitor 190. When the voltage on the capacitor 184 reaches approximately 0.7V, it causes the transistor 180 to turn ON and discharge the capacitor 190. While the voltage at the node 150 remains present, the transistor 180 remains ON and prevents the capacitor 190 from charging and from causing a trigger pulse to be applied through the diac 192 to the inverter transistor 132.

As mentioned above, the component values in the preferred embodiment are chosen so that the capacitor 186 will not become charged to approximately 0.7V (at which it will cause the transistor 180 to turn ON) until approximately two hundred milliseconds after the voltage appears at the node 150. Thus, whereas the diode 194 serves to disable re-triggering of the inverter transistor 132 by the capacitor 190 and the diac 192 on a cycle-by-cycle basis, the transistor 180 and its associated components continuously disable re-triggering of the inverter transistor 132 by the capacitor 190 and the diac 192 approximately two hundred milliseconds after the voltage appears at the node 150.

Thus, safe and efficient start-up and operation of the circuit is provided because after an initial discharge of the capacitor 190 through breakdown of the diac 192 has applied a pulse to the inverter transistor 132 to trigger the inverter into operation, (i) the diode 194 ensures that on a cycle-by-cycle basis the capacitor 190 does not re-trigger (through repeated breakdown of the diac 192) the inverter transistor 132, and (ii) the transistor 180 and its associated components ensure continuously that the capacitor 190 does not re-trigger the inverter transistor 132.

In addition, it will be understood that if the lamp 102 is not properly connected and its electrode 102B does not fully bridge the connector terminals 160 and 162, the circuit is prevented from starting-up and operating because the node 150 is not connected to the voltage at the node 140 and so cannot charge the capacitor 190 to cause a trigger pulse to start the inverter.

Further safe operation of the circuit is provided by the transistor 196 and its associated components in the following manner. If, after the inverter has been triggered into operation, the lamp for any reason fails to strike (or if, having struck, the lamp develops a fault and goes into a so-called "diode mode" of operation, as typically happens as a lamp nears the end of its useful life), the voltage at the node 148 rises. The raised voltage at the node 148 causes the capacitor 210 to charge through the resistor 198. When the voltage on the capacitor 210 reaches 32V, the diac 204 breaks down and allows the capacitor 210 to discharge into the base of the transistor 196. In the preferred embodiment the component values are chosen so as to typically cause this diac breakdown to occur approximately one second after the raised voltage appears at the node 148. This injection of charge into the base of the transistor 196 causes the transistor to turn ON. When the transistor 196 turns ON the voltage at its collector electrode is pulled low, which directly pulls low the voltage at the base electrode of the inverter transistor 132, immediately turning OFF the inverter transistor 132 and arresting operation of the inverter.

Additionally, it will be understood that if during the course of normal, steady-state operation of the circuit the lamp 102 is removed, the connector terminals 160 and 162 cease to be bridged. This introduces an open circuit in the path from the node 150 to the node 140, which immediately terminates current flow through the primary winding 154 of the feedback transformer 156. The cessation of current in the feedback transformer's primary winding 154 causes current to cease in the transformer's secondary windings 164 and 172, immediately removing base drive from the inverter transistors and arresting operation of the inverter.

Thus, it will be appreciated that the fluorescent lamp driver circuit 100 described above provides safe and efficient start-up and operation by (i) disabling re-triggering of the inverter after a predetermined time following power-up, and (ii) disabling operation of the inverter in response to the occurrence of a fault condition after the predetermined time. Also, it will be appreciated that the circuit provides additional safety by open-circuiting the path for current in the feedback transformer, and so immediately disabling the inverter, if the lamp 102 is removed.

It will be appreciated that, although the circuit described above drives a single lamp, the invention is not limited to driving only one lamp, and may be alternatively applied to the driving of two or more lamps, as desired. It will also be appreciated that, although the circuit described above drives an instant-start fluorescent lamp, the invention is not limited to driving only such lamps, and may be alternatively applied to the driving of other types of gas discharge lamps, as desired.

It will be appreciated that the particular component values and the particular voltage levels may be varied as desired to suit different types of fluorescent or other gas discharge lamps.

It will be appreciated that various other modifications or alternatives to the above described embodiment will be apparent to a person skilled in the art without departing from the inventive concept.

I claim:

1. A circuit for driving a gas discharge lamp load, the circuit comprising:

oscillator means;

initiating means for initiating operation of the oscillator means after power-up of the circuit;

first disabling means for disabling the initiating means after a predetermined time following power-up of the circuit; and second disabling means for disabling the oscillator means in response to a fault condition after the predetermined time.

2. A circuit according to claim 1 wherein the initiating means comprises first capacitance means connected to charge following power-up of the circuit and first threshold means coupled between the first capacitance means and the oscillator means to apply an initiating signal to the oscillator means when the voltage on the first capacitance means exceeds a first predetermined level.

3. A circuit according to claim 2 wherein the first threshold means comprises a first diac.

4. A circuit according to claim 2 wherein the first disabling means comprises second capacitance means connected to charge following power-up of the circuit and first transistor means coupled between the first capacitance means and the second capacitance means to discharge the first capacitance means when the voltage on the second capacitance means exceeds a second predetermined level.

5. A circuit according to claim 4 wherein the second disabling means comprises third capacitance means connected to charge following occurrence of a fault condition after the predetermined time and second threshold means coupled between the third capacitance means and the oscillator means to apply a disabling signal to the oscillator means when the voltage on the third capacitance means exceeds a third predetermined level.

6. A circuit according to claim 5 wherein the second threshold means comprises a second diac and second transistor means coupled between the second diac and the oscillator means and arranged to be enabled by the breakdown of the diac and to apply the disabling signal to the oscillator means in response thereto.

7. A circuit according to claim 1 wherein the first disabling means further comprises cyclic disabling means for disabling the initiating means during each cycle of operation of the oscillator means before the predetermined time.

8. A circuit according to claim 1 further comprising third disabling means for disabling operation of the initiating means if the lamp load is not present.

9. A circuit according claim 8 wherein the third disabling means comprises first and second contact means arranged to be bridged by an electrode of the lamp load.

10. A circuit according to claim 1 wherein the oscillator means comprises an inverter, an LC oscillator coupled to the inverter to be driven thereby and a feedback means coupled between an output of the inverter and an input of the inverter to control the inverter in response to the inverter output.

11. A circuit according to claim 10 wherein the LC oscillator is a series-resonant LC oscillator.

12. A circuit according to claim 11 further comprising lamp load output terminals arranged to drive the lamp load in series with the inductive portion of the series-resonant LC oscillator and in parallel with the capacitive portion of the series-resonant LC oscillator.

13. A circuit according to claim 12 wherein the feedback means comprises a transformer having a primary winding coupled in series with the capacitive portion of the series-resonant LC oscillator.

14. A circuit according to claim 1 wherein the predetermined time is approximately 200 milliseconds.

15. A circuit according to claim 1 wherein the second disabling means is arranged to disable the oscillator means approximately one second after initiation of the fault condition.

16. A circuit for driving a gas discharge lamp load, the circuit comprising:

oscillator means having:

an inverter; and a series-resonant LC oscillator;

initiating means for initiating operation of the inverter after power-up of the circuit;

first disabling means for disabling the inverter after a predetermined time following power-up of the circuit; and second disabling means for disabling the inverter in response to a fault condition after the predetermined time.

* * * * *